United States Patent [19]

Shell

[11] 3,995,923
[45] Dec. 7, 1976

[54] PANEL LOCKING ARRANGEMENT
[76] Inventor: Irving W. Shell, 442 Wellington Ave., Chicago, Ill. 60657
[22] Filed: Mar. 20, 1975
[21] Appl. No.: 560,370
[52] U.S. Cl. .............................. 312/111; 312/140; 248/188.4; 85/3 S
[51] Int. Cl.² .................... F16B 17/00; F16B 12/00
[58] Field of Search .......... 312/140, 111, 195, 263; 85/3 S; 248/188.4; 403/292, 294, 403; 108/64

[56] References Cited
UNITED STATES PATENTS

| 215,348 | 5/1879 | Gregg | 312/111 |
|---|---|---|---|
| 1,574,500 | 2/1926 | Marte | 85/3 S |
| 1,716,625 | 6/1929 | Dawson | 312/111 |
| 2,246,834 | 6/1941 | Bowman | 85/3 S |
| 2,471,175 | 5/1949 | Tubbs | 85/3 S |
| 2,702,732 | 2/1955 | McCarran | 312/111 |
| 2,733,629 | 2/1956 | Vogt | 85/3 S |
| 3,045,389 | 7/1962 | Arnit | 248/188.4 |
| 3,137,965 | 6/1964 | Davies | 248/188.4 |
| 3,181,923 | 5/1965 | Guillon et al. | 312/195 |
| 3,302,799 | 2/1967 | Blodee | 312/111 |

FOREIGN PATENTS OR APPLICATIONS

| 1,378,237 | 10/1964 | France | 312/263 |
|---|---|---|---|
| 80,937 | 5/1963 | France | 312/263 |
| 555,554 | 7/1932 | Germany | 312/111 |
| 440,609 | 12/1967 | Switzerland | 312/111 |
| 1,137,675 | 12/1968 | United Kingdom | 312/140 |

Primary Examiner—Paul R. Gilliam
Assistant Examiner—Victor N. Sakran
Attorney, Agent, or Firm—Albert Siegel

[57] ABSTRACT

A lock arrangement for securing a first panel to a second panel, and including a bolt having a head formed to the outer end of a shaft. A resilient means encircles the shaft and is operatively associated with the first panel, and the head of the bolt is operatively associated with the second panel. The panels are secured together by the force of the resilient means when the head is locked in the second panel, and the panels are released when the head is dis-engaged from the second panel. Alternatively, a panel may be secured to a bracket using said bolt and said resilient means, or a pair of panels may be secured to a bracket utilizing a pair of said bolts and a pair of said resilient means.

16 Claims, 11 Drawing Figures

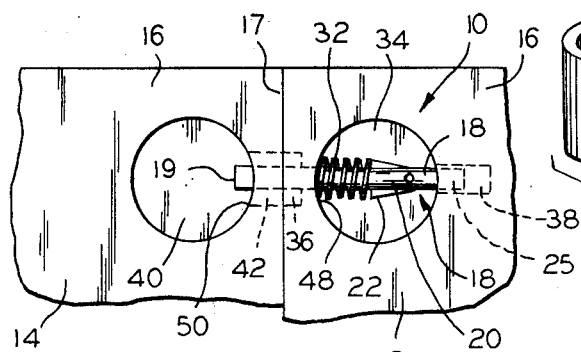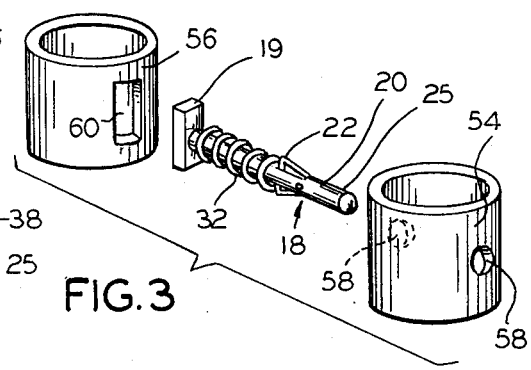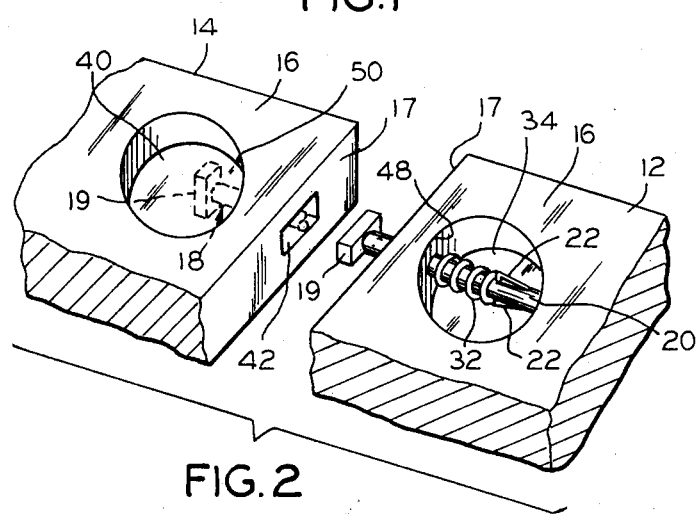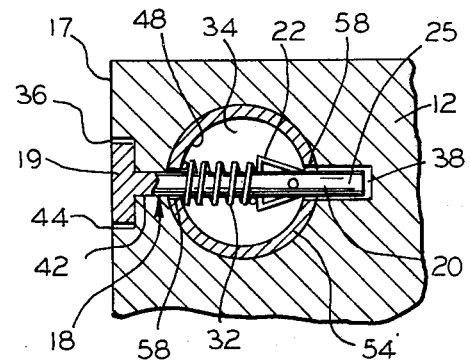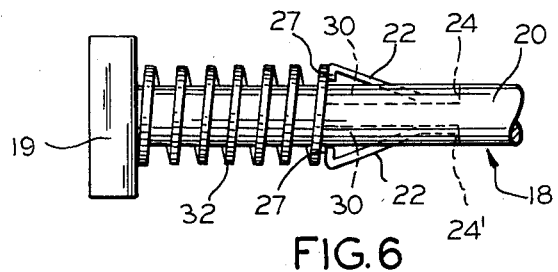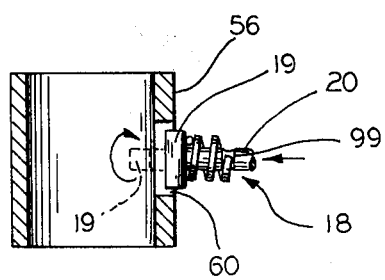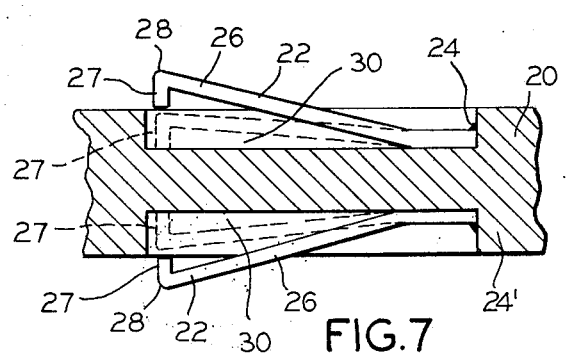

PANEL LOCKING ARRANGEMENT

BACKGROUND OF THE INVENTION

This invention relates generally to a lock arrangement for securing a pair of panels together, and more specifically relates to a lock means including a rotatable bolt held in a locked-position by a resilient means.

Wall, panels and the like, were secured together, heretofore, by various means. For example, brackets attached to the rear side of panels with screws or nails, were commonly used. However, the disassembling and re-assembling of the panels frequently weakened and sometimes even caused cracks in the panel structure, and made them unsuitable for supporting any objects other than those having minimal weight. Panels were also secured together by press fitting one into the other, such as those formed with tongues and grooves. Many of these type panels due to careless manufacturing did not provide a secure and tight press fit with each other. Also, many that initially secured firmly together lost their tightness in time, and eventually would slip out of contact.

The subject invention on the other hand, provides a removable lock for firmly securing one panel to another panel. The panels locked in accordance with the invention herein are easily assembled or disassembled, without the necessity of screwing into or out from the panel structure. Nevertheless, the attachment of the panel is tight and secure and there is virtually no possibility of the panel connection weakening and the panels slipping away from each other.

It is therefore a primary object of the invention to provide a lock means for removably securing one panel to another.

Another object is to provide a lock for securing two panels together which are easily connected or disconnected.

Another object is to provide means for securely attaching two panels together without requiring screws or nails to embed into the panel structure.

Another object is to provide a lock means including a channelled bracket for securely attaching a plurality of panels. A related object is to provide such bracket with four entranceways, so that the panels may be connected into an end to end relationship, or perpendicular to each other.

BRIEF DESCRIPTION OF THE DRAWINGS

Referring to the drawings, in which the same characters of reference are employed to indicate corresponding or similar parts throughout the several Figures of the drawings:

FIG. 1 is a fragmentary rear view of a pair of panels removably secured together with a lock arrangement, embodying the principles of the invention;

FIG. 2 is a perspective view of the panels spaced apart just prior to securing the panels together, and showing the head of the bolt in phantom rotated ninety degrees (locked-position);

FIG. 3 is a perspective view of the bolt and spring and also showing the cylindrical inserts which may be positioned in the panels;

FIG. 4 is a fragmented sectional view showing the shaft of the bolt extending through an insert and the head thereof recessed in the panel when the lock is in an unlocked-position;

FIG. 5 is a sectional view of the insert for one of the panels prior to positioning the head of the bolt therein, and showing the head in phantom in a locked-position inside the insert;

FIG. 6 is a fragmentary front view of the bolt and showing a pair of leaf springs limiting the inward movement of the spiral spring;

FIG. 7 is a fragmentary sectional front view of the shaft of the bolt, and illustrating the leaf springs in phantom depressed in recesses;

DESCRIPTION OF THE PREFERRED EMBODIMENT

Figure 11:
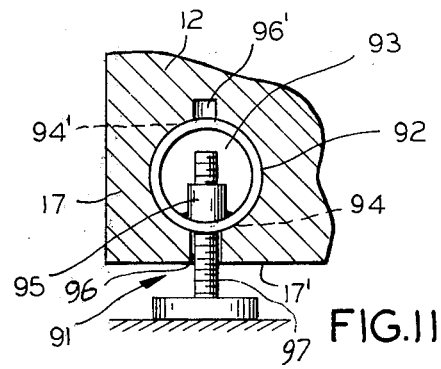
FIG. 11 illustrates an adjustable foot for supporting the panel above the ground.

Referring now more particularly to FIGS. 1 through 7 of the drawings, the reference numeral 10 indicates generally a lock for securing two panels 12, 14 together. Each panel 12, 14 includes a front side 15, rear side 16, an inner edge 17 and a bottom edge 17' (FIG. 11). When the lock 10 is in a locked-position the inner edges 17 of the panels abut each other. The lock 10 is shown positioned on the rear side 16 of the panels 12, 14, which would be desirable if the front side 15 were more decorative than the rear side 16.

The lock 10 includes a substantially T-shaped bolt 18 having a rectangular head 19 at the outer end thereof integrally formed to a cylindrical shaft 20. A pair of substantially L-shaped leaf springs 22 are rigidly secured at opposed sides of the shaft 19 at points 24, 24' spaced from the inner end 25 of the bolt 18. Each spring 22 includes an elongated leg 26 and a shortened leg 27 bent therefrom. Leg 26 extends outward on an incline toward the head 19 until reaching the junction 28 with the shortened leg 27. Legs 27 extend inward toward the shaft 20. The springs 22 depress inside complementary L-shaped recesses 30 formed in shaft 20 (FIGS. 6 and 7).

A coiled spring 32 extends around the shaft 20 between the head 19 and legs 27 of the leaf springs 22. In the locked-position, the two abutting panels 12, 14 are clamped together by the cooperative action of the head 29 and the coiled spring 32, and held securely in place by the tension force in the spring 32.

To assemble the lock in position, a cavity 34, which may be circular, is formed in the rear side 16 of panel 12 and linked to the inner edge 17 by bore 36. Hole 38 is also linked with cavity 34 and is positioned opposite to bore 36. A cavity 40 is formed in the rear side 16 of panel 14, and linked to the inner edge 17 by a rectangular bore 42. Bore 36 in panel 12 includes a rectangular recess 43 linked with a cylindrical bore part 44, which in turn, is linked with the cavity 34.

The bolt 10 is inserted into bore 36 with the inner end 25 first extending through. Prior to the inner end 25 being positioned in hole 38, the coiled spring 32 is placed over the leaf springs 22, so the opposite ends of the coil spring 32 contact the inside wall 48 of the cavity 34 and the legs 27 of the leaf springs 22. The leaf springs 22 depress into the recesses 30 as they pass through bore 36, and expand outward upon entering the cavity 34. The head 19 is dimensioned to recess into the rectangular recess 43 as shown in FIG. 4, when the lock 10 is in an unlocked-position.

After the shaft 20 is positioned in panel 12, the head 19 is inserted into the rectangular bore 42 in panel 14. Upon the head 19 reaching cavity 40, the bolt 18 is turned ninety degrees, which is a quarter turn, so that head 19 is thereby locked inside cavity 40. The tension in the coiled spring 32 causes the head 19 to abut the inside wall 50 of cavity 40 and forces the two panels 12, 14 in an abutting and locking contact. To release lock 10, the bolt 18 is turned ninety degrees, and the resilient force of spring 32 pulls the head 19 through the rectangular bore 42 toward the inner edge 17 of panel 12, and the head 19 recedes into the rectangular recess 43 as the bolt inner end 25 moves further into the hole 38.

Alternatively, instead of leaf springs 22, a pin 52 (FIG. 9) may be rigidly secured on the shaft 20. Since the pin 52 is dimensioned longer than the diameter of bore 36, the pin 52 would be rigidly attached to shaft 20 after the bolt end 25 passes into the cavity 34, such as by press fitting the pin 52 into an aperture 53 drilled into the shaft 20. Thus, the coiled spring 32 would be inserted on shaft 20 prior to press fitting pin 52 and thereafter confined between the pin 52 and the cavity inner wall 48 (FIG. 9).

For panels constructed of relatively solid or rigid materials such as hard wood, rigid plastic or metal, the bearing contact of the head 19 and spring 32 and also the contact of the leaf spring 22 or pin 52 with the panel material, would generally have little or no effect on the panel structure. However, when the panels are formed from soft or less rigid materials, such contact between the various component parts of lock 10 and the panel walls, may cause undesirable splintering or distortion of the panels. To avoid weakening of the panels, a cylindrical insert 54 (FIGS. 3 and 4) may be press fitted into cavity 34 of panel 12, and a cylindrical insert 56 may be press fitted into cavity 40 of panel 14. Inserts 54, 56 may be constructed of metal or plastic to provide a protective shield for preventing the parts of the lock 10 from embedding or digging into the panel material.

Insert 54 includes a pair of aligned openings 58, for communicating respectively with bore 36 and hole 38, and are sized to permit passage of the shaft 20. Insert 56 includes a rectangular opening 60 dimensioned to receive head 19 of the bolt 18 (FIGS. 3 and 5). The head 19 abuts the inside surface of the insert 56 perpendicular to the opening 60.

Figure 8:
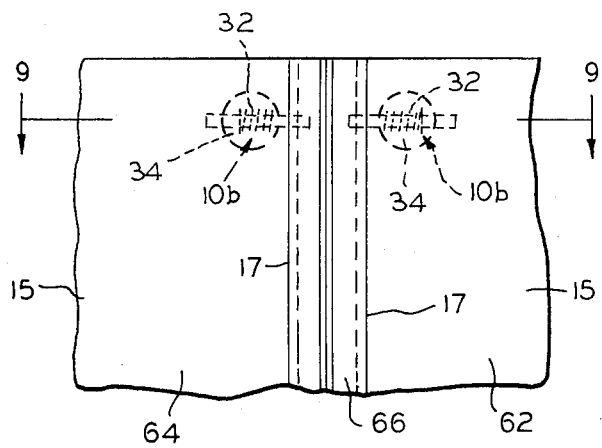
FIG. 8 is a front view of a pair of panels secured on opposite sides of a four entranceway channelled bracket, to illustrate another embodiment of the subject invention.
Figure 9:
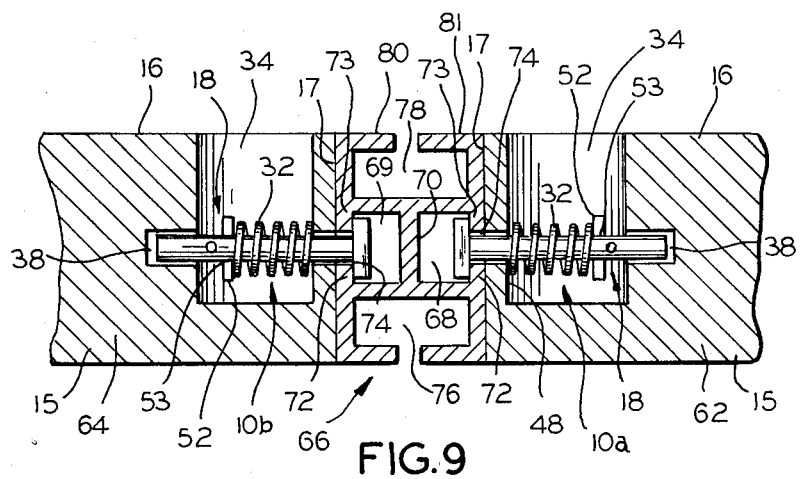
FIG. 9 is an enlarged sectional view, taken on the plane of the line 9—9 in FIG. 8, viewed in the direction indicated, and showing a pair of bolts locked inside the channelled bracket.
Figure 10:
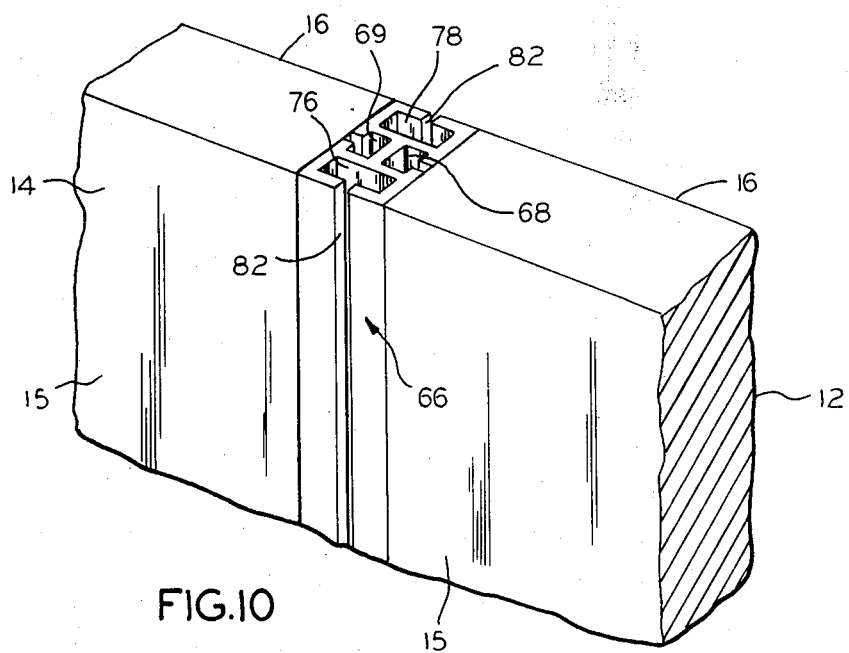
FIG. 10 is a fragmentary perspective view of the pair of panels secured to the channelled bracket.

Turning now specifically to FIGS. 8, 9 and 10, another embodiment is shown for securing panels 62 and 64 together. Panels 62, 64 are similar to panel 12, and similar parts will be designated by the same numerals. A bracket 66 is secured to panel 62 by lock 10a and secured to panel 14 by lock 10b. The locks 10a and 10b include the same parts as lock 10, and also will be identified by the same numerals. The bracket 66 comprises a pair of identical side channelled sections 68, 69 connected together by a central web 70. A pair of opposed flanges 72, 73 define an entrance opening 74 therebetween into the corresponding side channel section 68 or 69.

When the bracket 66 is used between the panels 62, 64, the head 19 of lock 10a abuts the inside surface of the flanges 72, 73 of channel section 68 and the coiled spring 32 abuts the inside surface of cavity 34; and similarly, the head 19 abuts the inside surface of the flanges 72, 73 of side channel section 69, and the coiled spring 32 abuts the inside surface of cavity 34. Thus, panels 62, 64 are in abutting contact with bracket 66 throughout the length thereof.

As may be seen from FIGS. 9 and 10, bracket 66 also includes front and rear channel sections 76, 78 and each includes flanges 80, 81 defining an opening 82 therebetween. Mounting brackets (not shown) for horizontal panels, for example, may be inserted into the front and rear channels 76, 78, or such front and rear channels 76, 78 may also be used for securing two panels. Therefore, since bracket 66 has four entranceways, one to four panels may be secured to bracket 66. Also, two panels may be secured end to end, or perpendicular one with the other.

The panels 12, 14 when secured together by lock 10 may be mounted to a wall or positioned on the floor. For floor positioning, an adjustable foot means indicating generally by reference numeral 91 as shown in FIG. 11, for setting the height of panel 12, may be used. Foot means 91 comprises an insert 92 press fitted into a circular recess 93 formed inward from the rear side 16 of the panel 12. The insert 92 includes opposed openings 94, 94'. A threaded nut 95 is secured to the inside surface of the insert 92 in alignment with opening 94. A bore 96 is formed upward from panel bottom edge 17' and links with recess 93. A bore 96' opposed to bore 96 also links with recess 93. Bores 96, 96' communicate with insert openings 94, 94' when the insert 92 is inside the recess 93.

A threaded bar 97 is rigidly attached to a disc 97 and extends outward therefrom. Bar 97 screws into the nut 95 after passing through bore 96, and may extend to the end of the bore 96', thereby providing a substantial range of height adjustment for the panel 12 between the bottom edge 17' and the floor.

As shown only in FIG. 5, the shaft 20 may also include a circular groove 99 formed therein, for receiving the outer end of the spring 32. When the spring 32 is expanded, the spring end abuts the inside of the groove 99. Hence, the groove 99 may be used in the alternative instead of the leaf spring 22 or pin 52.

The description of the preferred embodiments of this invention is intended merely as illustrative of the subject invention, the scope and limits of which are set forth in the following claims.

I claim:
1. A lock for securing a panel member to a wall member, each of said members including a front edge and a back edge, said lock comprising:
    an opening formed in each of said members, for communicating the front edge to the back edge;
    a shaft having an inner end and an outer end, for extending into the openings of both said members;
    a head attached to the outer end of the shaft for associating with one of said members and the inner end of the shaft being associated with the other of said members, said head having a locked-position and an unlocked-position, said head being dimensioned to pass through the opening corresponding to said one member when in the unlocked position and being prevented from passing through when in the locked-position; and resilient means positioned on said shaft and associated with said other member for locking said panel and wall members together when the head is in the locked-position, said panel and wall members being unlocked when the head is in the unlocked-position.

2. The lock of claim 1, wherein the rotation of said shaft switching the head from the locked-position to the unlocked-position, and a surface associated with said one member whereby said head contacting the surface when in the locked-position and moving out of contact with with said surface and through the corresponding said opening of said one member when switched to the unlocked-position.

3. The lock of claim 1, wherein said resilient means is a coiled spring encircling the shaft and the lock further includes:
a stop attached to the shaft to limit the movement of the spring toward the inner end of the shaft, said spring being positioned between the stop and the head.

4. The lock of claim 3, wherein said stop includes a leaf spring normally extending outward from the shaft for limiting said movement of the spring and being depressed inward toward the shaft upon the application of an external pressure to permit movement of the spring toward the inner end of the shaft.

5. The lock of claim 1, wherein said head is dimensioned whereby the maximum width dimension is less than the maximum length dimension.

6. The lock of claim 1, wherein said wall member is a bracket including a channelled portion comprising spaced apart side walls attached at their inner ends to an inner wall and attached at their outer ends to a pair of flanges extending inward therefrom to define a space between the flanges, said head abutting the inside surface of the flanges when in the locked-position for securing said panel to the bracket, and said head being movable through said space when in the unlocked-position.

7. The lock of claim 6, wherein said bracket further includes a second channelled portion comprising a second pair of spaced apart side walls attached at their outer ends to a second set of flanges to define a second space therebetween, said second channelled portion enabling a second panel to be secured to said bracket.

8. The lock of claim 7, wherein said bracket further includes a third and fourth channelled portion having respectively a third set and a fourth set of flanges for defining respectively a third space between the third set of flanges and a fourth space between the fourth set of flanges, said first second, third, and fourth channels and being dimensioned to contain said head when in the locked-position and the corresponding spaces being dimensioned to permit passages of said head when in the unlocked-position.

9. The lock of claim 1 further includes:
a first surface associated with said one member;
a second surface associated with the other member, said resilient means having an inner end and an outer end; and
means associated with the shaft for preventing inward movement of the inner end of the resilient means along the shaft, the outer end of the resilient means contacting said second surface, said resilient means being compressed when the head is in the locked-position for clamping said panel and wall members together, the inner end of the shaft moving away from said second surface to permit expansion of said resilient means when the head is switched from the locked to the unlocked-position, said head contacting said first surface when in the locked-position and moving out of contact with said first surface when switched from the locked to the unlocked-position.

10. The lock of claim 9 still further includes:
a pin protruding out from the shaft and the inner end of the resilient means abutting said pin, said resilient means being compressed and expanded between said said second surface and the pin.

11. A lock for securing a panel member to a wall member, each of said members including a front edge, said lock comprising:
a cavity formed in each of said members;
an opening formed in each of the members for communicating the front edge with the cavity of the corresponding member;
a shaft having an inner end and an outer end, for extending through the openings and into the cavities of said members;
a head attached to the outer end of the shaft for extending into one of said cavities, said head having a locked-position and an unlocked-position, said head being dimensioned to pass through the opening corresponding to said one cavity and into said one cavity when in the unlocked-position; and
resilient means positioned on said shaft and in the other of said cavities, for locking said panel and wall members together when the head is in the locked-position, said panel and wall members being unlocked when the head is in the unlocked-position.

12. The lock of claim 7 includes a hollow sleeve positioned in the cavity of said one member, said sleeve including an aperture communicating with the opening corresponding to the cavity of said one member, said head passing through said aperture when in said unlocked-position, said head abutting the inside surface of the sleeve adjacent the aperture when in the locked-position.

13. The lock of claim 11, wherein a hole is formed in the other of said members and links with the corresponding cavity, said shaft operatively extending through the opening and cavity and into the hole of said other member, said shaft being further inside said hole when the head is in the unlocked-position than when in the locked-position.

14. A lock for securing a panel member to a wall member comprising:
a shaft having an inner end and an outer end, for extending into both said members;
an opening formed in formed in one of said members for communicating the front edge with a cavity on the inside thereof;
a head attached to the outer end of the shaft, said head having a locked-position and an unlocked-position, said head passing through said opening and into said cavity when in the unlocked-position and prevented from passing out from said cavity and said opening when in the locked-position, said head being dimensioned whereby the maximum width dimension is less than the maximum length dimension; and
resilient means positioned on said shaft and associated with the other of said members, for locking said panel and wall members together when the head is in the locked-position, said panel and wall members being unlocked when the head is in the unlocked-position.

15. A combination panel and lock arrangement comprising:
   a first panel member having a cavity;
   a second panel member having a cavity;
   a bracket including a first channelled section and a second channelled section;
   a first shaft and a second shaft, each of said shafts including an outer end and an inner end;
   a first head attached to the outer end of the first shaft, and a second head attached to the outer end of the second shaft, each of said heads having a locked-position and an unlocked-position, said first head being positioned in said first section when in the locked-position, and said second head being positioned in said second section when in the locked-position;
   a first resilient means associated with said first shaft and positioned in said cavity of said first panel, and cooperating with said first head for securing said first panel to said bracket; and
   a second resilient means associated with said second shaft and positioned in said cavity of said second panel, and cooperating with said second head for securing said second panel to said bracket.

16. The bracket of claim 15 further includes a third channelled section and a fourth channelled section, said first head or second head being dimensioned to pass into any of said channelled sections when in the unlocked-position and to be operatively locked inside any of said channelled sections when in the locked-position.

* * * * *